Figure 1A:
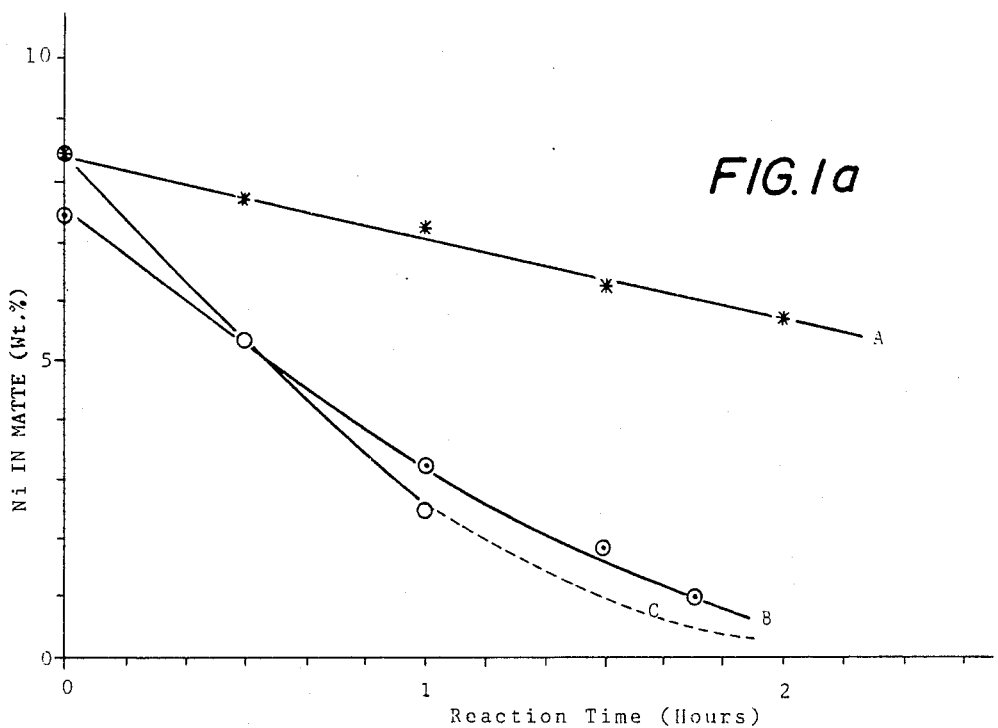

United States Patent [19]

Thomassen et al.

[11] Patent Number: 4,828,809
[45] Date of Patent: May 9, 1989

[54] SEPARATION OF NICKEL FROM COPPER IN AUTOCLAVE

[75] Inventors: Thomas Thomassen, Brekkesto; Carl O. Kostol; Hans Zachariansen, both of Vagsbygd, all of Norway

[73] Assignee: Falconbridge, Limited, Canada

[21] Appl. No.: 855,897

[22] Filed: Apr. 24, 1986

Related U.S. Application Data

[63] Continuation-in-part of Ser. No. 740,646, Jun. 3, 1985, abandoned.

[30] Foreign Application Priority Data

Oct. 18, 1983 [NO] Norway ................................. 833784

[51] Int. Cl.[4] ........................ C01G 3/05; C01G 53/11
[52] U.S. Cl. ......................................... 423/39; 423/34; 423/40; 423/43; 423/46; 423/141; 423/150; 75/2; 75/101 R; 75/108; 75/109; 75/112; 75/114; 75/117; 75/118 R
[58] Field of Search .................. 423/38, 42, 39, 43, 423/40, 34, 150, 46, 141; 75/2, 101 R, 109, 108, 112, 114, 117, 118 R

[56] References Cited

U.S. PATENT DOCUMENTS

| | | |
|---|---|---|
| 1,047,825 | 12/1912 | McKechnie et al. ................ 423/141 |
| 3,880,653 | 4/1975 | Hougen ................................ 423/40 |
| 3,923,616 | 12/1975 | Atodan et al. ......................... 423/39 |
| 3,981,962 | 9/1976 | Smyres et al. ....................... 423/150 |
| 3,988,417 | 10/1976 | Polinsky ............................... 423/40 |
| 3,998,628 | 12/1976 | Gandon et al. ....................... 423/40 |
| 4,053,305 | 10/1977 | Smyres et al. ......................... 423/38 |
| 4,337,128 | 6/1982 | Haakonsen et al. .................. 423/38 |
| 4,468,302 | 8/1984 | Parker et al. .......................... 75/109 |

Primary Examiner—Robert L. Stoll
Attorney, Agent, or Firm—Darby & Darby

[57] ABSTRACT

Nickel is separated from copper contained in predominantly nickel- and copper-bearing sulphidic matte and alloys by chlorine leaching in an autoclave at overatmospheric pressure. The leaching is conducted in an acidic solution at a redox potential range which favors the dissolution of nickel over copper. The obtained leach solution is purified in a cementation step carried out at atmospheric or over-atmospheric pressure by adding more sulphidic matte or alloy particles. The separated purified solution is treated for nickel recovery. Any cobalt present in the sulphidic matte or alloy reports with the nickel. Copper is recovered from the separated residue, which will also retain precious metals, if present.

24 Claims, 8 Drawing Sheets

SEPARATION OF NICKEL FROM COPPER IN AUTOCLAVE

This is a continuation-in-part, of application Ser. No. 740,646, filed June 3, 1985 now abandoned.

This invention relates to the hydrometallurgical treatment of solid particles selected from sulphidic matte and alloys, more particularly to the selective leaching of nickel from predominantly copper and nickel-containing sulphidic matte and alloys, and subsequently to recovering copper and precious metals from the residue.

Mattes are the products of smelting sulphidic ores. The sulphidic ores and concentrates usually contain nickel, cobalt, iron, copper, other non-ferrous metals and some precious metals. During the smelting process, which often includes a converting step as well, most of the iron and silicate-containing gangue is slagged off, and the underlaying matte contains most of the copper, nickel and cobalt originally present in the ore and concentrate, mainly in the form of sulphides together with minor amounts of oxides, some retained iron and other non-ferrous metals as impurities, and all the precious metals initially combined with copper and nickel in the concentrate or ore.

The present invention is directed to extracting copper, nickel and precious metals from sulphidic matte and alloy particles by hydrometallurgical methods solubilizing nickel, and cobalt if present, selectively as chloride and retaining copper and precious metals in the form of sulphides in the residue. The recovery of copper and precious metals is carried out by conventional means and processes subsequently, and do not form part of the present process description.

Chlorine leaching of sulphidic particles in acidic chloride solutions at atmospheric pressure is described in U.S. Pat. Nos. 3,880,653 and 3,975,189 (inventor Hougen). The above process is carried out in two stages: In the first stage the ground matte slurried in a chloride ion bearing solution, is leached with chlorine gas at a redox potential range of 200 to 500 mV measured against SCE (saturated calomel electrode), which is maintained by controlling the feeding of both the solids and the chlorine gas to the slurry. In the second stage, untreated nickel rich sulphides are added to the agitated slurry obtained in the first stage to preferentially recover nickel into the solution and precipitate copper as sulphide. The second stage is often referred to as a cementation step. In the atmospheric chlorine leaching at the required redox potential range, a large portion of the nickel contained in the matte will dissolve and also a small portion of the copper. The residue in the first stage of the leaching is composed of partially leached sulphides and retained elemental sulphur. In the second stage excess nickel bearing sulphides will precipitate or cement out the copper in solution as sulphide, with more nickel going into solution as chloride. The precipitation is enhanced by the reaction with elemental sulphur, which is also present in the slurry. Ideally in the second leaching stage of the process the copper is cemented out while all the nickel in the solids go into solution. In practice, however, the incompletely leached particles and the freshly added nickel rich sulphide particles becomes coated with copper sulphide and thus the dissolution process is slowed down. Hence the total extraction of nickel into the solution and elimination of copper from the solution are not attained in commercially economical residence times and temperatures of this atmospheric leaching process.

Prior processes have attempted to complete the selective dissolution process of nickel from matte by the use of autoclave leaching, thereby increasing the reaction temperature and hence the rate of the reaction. The process of U.S. Pat. No. 3,652,265 (Marschik et al.) utilizes an oxidative acidic pressure leach by treating ground matte and sulphur together with oxygen injection in an autoclave. This process, however, produces sulphuric acid and the nickel is dissolved in the form of sulphates, together with substantial amounts of highly soluble copper sulphates.

Another process is described in U.S. Pat. No. 4,384,940 (inventors D. L. Jones et al.) which subjects nickel, cobalt and iron containing sulphidic matte slurried in hydrochloric acid to oxygen-pressure leaching in an autoclave, and the separated residue is subsequently chlorine leached under atmospheric condition. Any copper present initially in the matte is co-dissolved with the nickel, and requires separation by other purification steps subsequently.

Yet another process utilizing pressure leaching a copper-nickel containing matte for selective extraction of nickel is described in U.S. Pat. No. 4,323,541 under oxidative conditions; this provess, however, is directed totally to sulphate extractive process technology.

It is the object of the present invention to selectively leach most of the nickel, and cobalt if present, contained in copper and nickel bearing sulphidic matte and similar sulphidic alloy particles in a chloride solution, and subsequently to recover the nickel and cobalt from the separated nickel containing solution by electrowinning, solvent extraction or other known methods; while retaining substantially all the copper and precious metals in the residue, for treatment in separate copper and precious metal recovery process steps.

An improved process has now been found for the separation of nickel from copper contained in solid particles selected from sulphidic matte and sulphidic alloys, which particles have been slurried in an acidic solution and chlorine leached at atmospheric pressure to provide a slurry in a chloride solution, wherein said slurry is subjected to leaching at over-atmospheric pressure at a pH less than 4, and at temperatures higher than 110° C., in an autoclave, to obtain a nickel-enriched chloride solution and a predominantly copper sulphide containing residue, subsequently precipitating dissolved copper in said nickel-enriched chloride solution by cementation onto freshly added sulphidic particles, and treating the separated nickel depleted residues for copper recovery. The nickel-enriched chloride solution is further treated for nickel recovery.

In one embodiment of this process the fresh sulphidic particles are added to the nickel-enriched leach liquor obtained by the autoclave treatment to cement out at atmospheric pressure any copper co-dissolved with nickel in the leach liquor.

In another embodiment of this invention the cementation of dissolved copper in the leach liquor by fresh sulphidic particle addition is conducted in an autoclave.

In yet another embodiment of this invention the over-atmospheric pressure leaching in an autoclave is conducted in the presence of chlorine gas.

In yet another embodiment of this invention the over-atmospheric pressure leaching is conducted with chlorine and oxygen injections in the autoclave.

In yet another embodiment of this invention the over-atmospheric leaching of the slurry to obtain a nickel-enriched chloride solution and a nickel depleted residue, and the subsequent cementation of copper onto fresh sulphidic particles added to the slurry of the over-atmospheric leaching step, are both conducted in separate autoclaves.

The following drawings illustrate the working of the preferred embodiments of this invention.

FIGS. 1/a and 1/b show plots of nickel leach rate studies at above atmospheric pressure.

FIGS. 2 to 8 show schematic flow diagrams of preferred embodiments of the present invention.

The preferred embodiments of the present invention will now be described in detail and illustrated by way of examples.

It is the object of most hydrometallurgical processes to convert the valuable metals present in ores, concentrates or heat treated intermediates such as mattes, into a water soluble form and to extract these in a pure form by further treatment steps. If all the valuable metals are dissolved together their respective subsequent separation can however, be very costly. Hence a selective dissolution process such as chlorine leaching of nickel-copper sulphidic mattes and alloys conducted at well controlled redox potentials have great advantages. The different embodiments of the present invention combine the pressure leaching of copper-nickel containing sulphide matte or sulphidic alloys obtained by smelting, in a chloride ion-containing aqueous slurry with the known methods of atmospheric chlorine leaching of such sulphidic mattes and alloys.

As already discussed above, the selective leaching of matte and other sulphidic alloys aims at combining the maximum dissolution of nickel, and cobalt if present, consistent with minimum copper content in solution, with the substantially complete retention of copper and attendant precious metals in the residue. These objectives can be attained faster at elevated temperatures and pressures, and are advantageously carried out according to the present invention in an autoclave. For the purposes of this invention an autoclave is described as a vessel appropriately lined, which can be sealed to withstand above-atmospheric internal pressure with or without gas injection, and simultaneously the contents of the vessel can be heated to temperatures in the region of 100°–300° C.

The first two of the following examples are included to show the beneficial effects of utilizing over-atmospheric pressure leaching in selectively extracting nickel contained in copper-nickel matte. Examples 3 to 9 show the various embodiments of the present process wherein the pressure leaching conducted in an autoclave is incorporated at various states with atmospheric chlorine leaching. These embodiments will be further illustrated by the appropriate flow sheets.

EXAMPLE 1

Laboratory experiments were conducted to show the improvement in nickel dissolution from ground copper nickel matte when the leaching is conducted at above atmospheric pressure and at elevated temperatures. The leaching experiments were carried out in a 6 liter titanium lined autoclave, having a chlorine atmosphere above the leach solution slurried with the ground matte. The solution at the start of the experiments had the following compositions:

Ni ions 185 g/L
Cu ions 25 g/L

The leach temperature was controlled at 150±1° C.; other conditions of the tests are tabulated in TABLE 1 below.

TABLE 1

| | Wt. of Dry Ground Matte, g | Initial Wt. % of Nickel in Matte | Rate of Chlorine Absorption during Leaching Cl$_2$ g/hr × kg | Duration of Leaching, Hours | Final Redox of Slurry mV | Rate of Nickel Leaching wt % Ni/hr |
|---|---|---|---|---|---|---|
| A | 1760 | 8.50 | 50 | 2 | 322 | 1.2 |
| B | 1870 | 7.45 | 80 | 2 | 331 | 3.7 |
| C | 1350 | 8.50 | 105 | 1 | 337 | 6.0 |

Figure 1B:
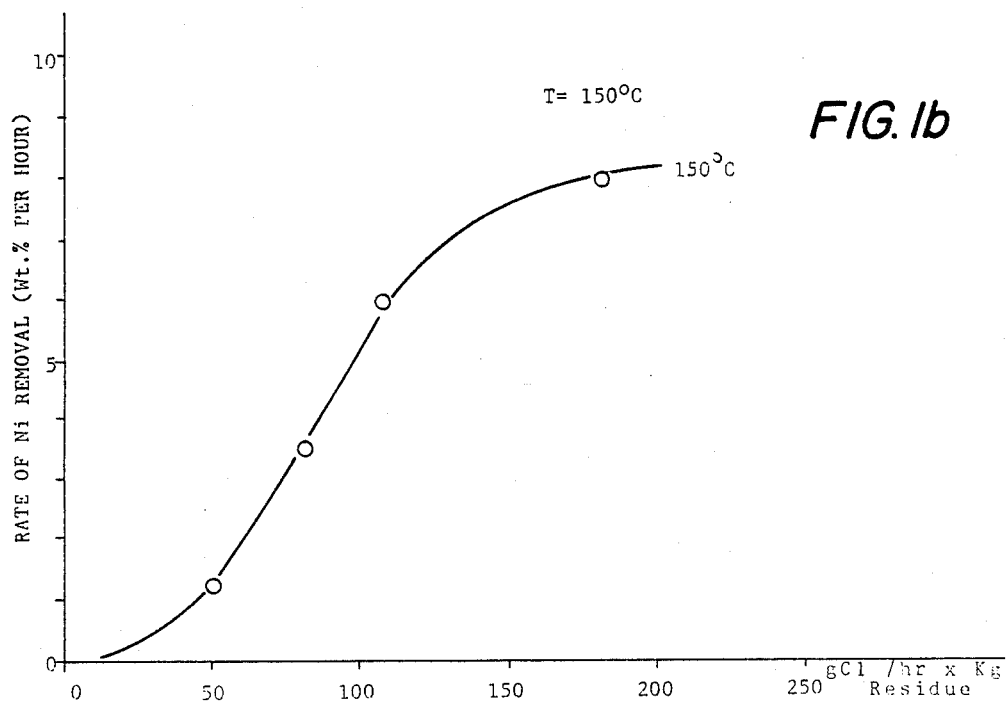

The rate of nickel removal by leaching is shown in FIG. 1a where the nickel content of the matte is plotted against the duration of leaching in the tests shown in TABLE 1. FIG. 1b indicates how the amount of nickel dissolved during leaching is effected by the amount of chlorine absorbed during leaching at elevated temperature. The beneficial effects of increased leach temperature and chlorine additions on the nickel dissolution from ground copper-nickel matte are clearly illustrated.

EXAMPLE 2

Laboratory autoclave leaching tests were conducted for selectively leaching nickel from a copper-nickel matte which was obtained by smelting copper concentrate. The matte was ground, slurried with a solution and leached in an autoclave at 135° C., having a two hour residence time. Chlorine together with air were injected into the autoclave during the leaching and the gas composition in the autoclave above the slurried matte was as follows:

Chlorine 50 vol. %
Oxygen 10 vol. %
Nitrogen 40 vol. %

The slurrying solution had the following initial and final compositions in grams per liter:

TABLE 2A

| | Total Copper | $Cu^{++}$ | HCl | $Cl^-$ | $SO_4^{--}$ | Total Iron | Nickel | Cobalt |
|---|---|---|---|---|---|---|---|---|
| | | | concentration in grams per liter | | | | | |
| Initial comp | 1 | 1 | 1 | 57 | 50 | 1 | 72 | 1 |
| Final comp. of the end of leaching | 38 | 8 | 17 | 181 | 59 | 3 | 144 | 3 |

The solids fed into the autoclave and leached, were analyzed, and were found to have the following initial and final composition in weight %.

TABLE 2B

|  | Copper | Nickel | Cobalt | Iron | Total Sulphur in weight % | Elemental Sulphur S° |
|---|---|---|---|---|---|---|
| Feed Composition | 50 | 10 | 1 | 2 | 28 | 0.6 |
| Leach Residue Composition | 55 | 1.4 | 0.2 | 3 | 35 | 4.6 |
| Leached Metal % of Initial amount present | 11% | 86% | 60% | 50% | | |

It can be seen that most of the nickel was leached in the autocalve leaching step but the copper concentration in the solution also increased, and a subsequent cementation step would be required to derive the full benefit of autoclave leaching of copper-nickel matte.

EXAMPLE 3

Figure 2:
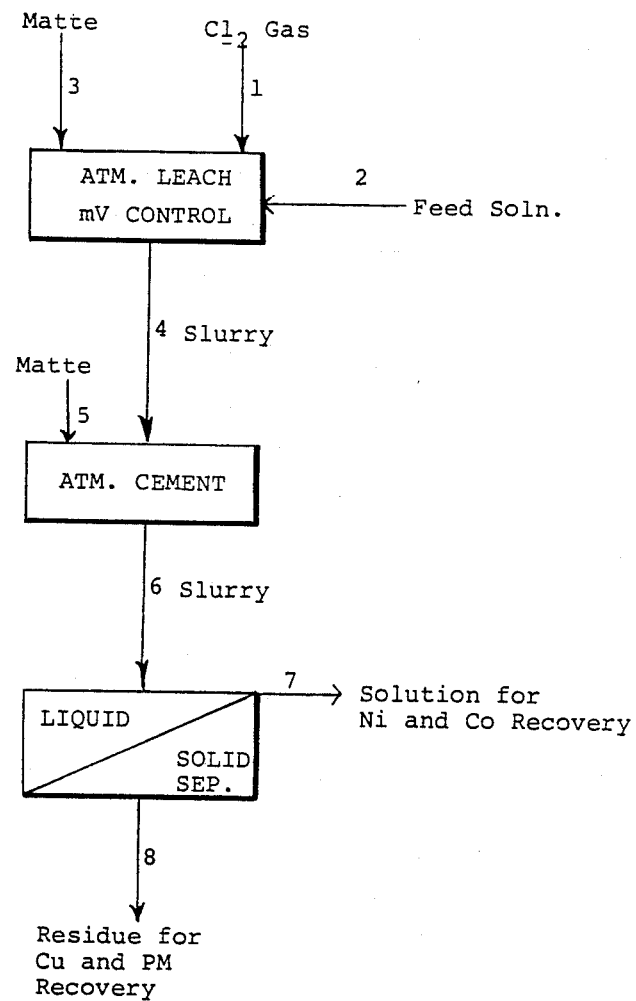

An atmospheric leaching process is shown schematically in FIG. 2 which is conducted according to conventional methods. Ground, untreated matte was fed through line (3) together with chlorine gas (1) and an acidic chloride solution (2) to a vessel at atmospheric pressure. The feeding of matte, and chlorine were coordinated so that the redox potential of the slurry was maintained at 360 to 380 mV, measured against S.C.E. The residence time of the matte was around 3 hours with constant agitation. The slurry temperature was close to the boiling point about 105°–110° C. The feed solution was spent nickel electrolyte, but other nickel and copper chloride bearing solutions would serve as well. The feed solution was acidic, containing 2-5 g per liter hydrochloric acid.

The leached slurry was transferred (4) to an atmospheric cementation vessel, with fresh untreated matte added through line (5). The duration of the cementation step was around three hours, after which the slurry was removed (6) and subjected to liquid-solid separation. The filtrate or overflow was removed (7) for nickel recovery by electrowinning, solvent extraction or similar knwon processes. The residue or solids in the underflow was further treated for copper and precious metal recovery by conventional methods.

TABLE 3 summarizes solution and solid compositions including slurries of solids in solution; as fed at various intermediate stages of the process and after the final liquid-solution separation.

It is clear that the initial 39 wt.% nickel content in the matte was considerably reduced and the copper content was increased by the two stage atmospheric leaching process. The nickel content of the residue however was still around 15% and the copper, although increased was only 48.9% in the separated residue, requiring further selective extraction treatment.

EXAMPLE 4

Figure 3:
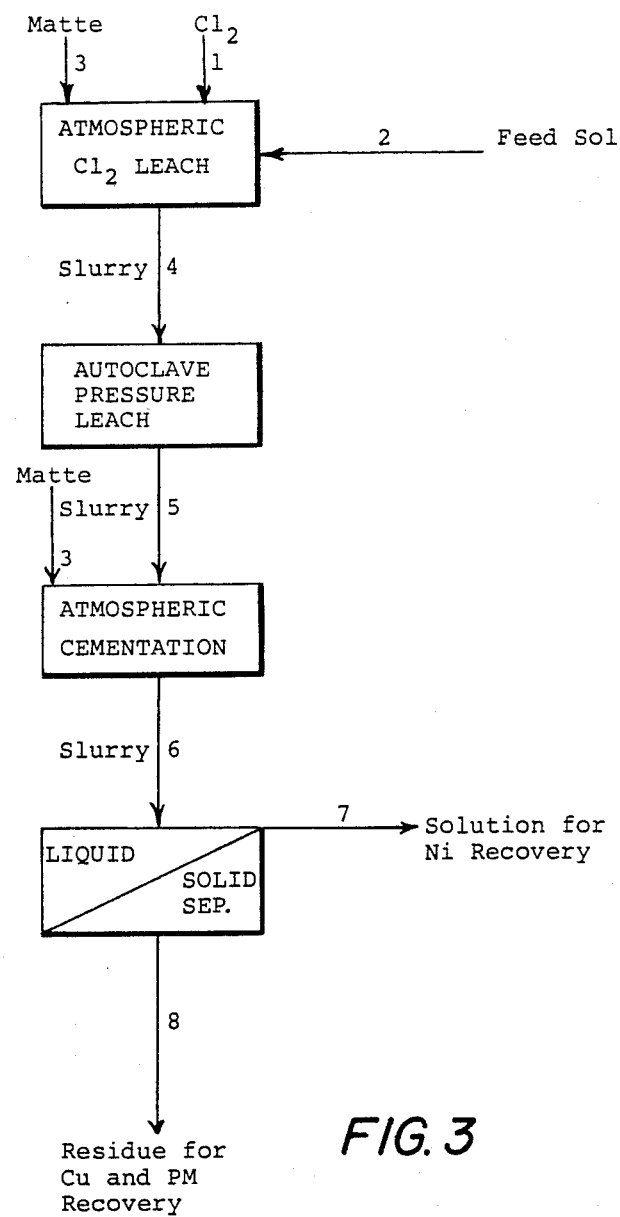

The process described in this example illustrates the selective leaching of nickel from copper-nickel matte with an autoclave pressure leach step incorporated in the process. The first stage of the atmospheric chlorine leach as shown in Example 3 and in FIG. 2, was followed by an autocalve leach and subsequently by an atmospheric cementation process step. The schematic flow sheet is shown in FIG. 3. The slurry from the atmospheric chlorine leach was taken by a line (4) to an autoclave to be pressure leached at 4 atmospheric pressure with agitation for 3 hours and at temperature range of 140°–150° C. The gas phase in the autoclave above the slurry was air. The redox potential of the slurry in the pressure leaching autoclave was found to be in the range of 240-290 mV. The pressure leached slurry from the autoclave was fed (5) to an atmospheric cementation vessel with the addition of fresh untreated matte (3). The retention time in the cementation vessel was 1.5 hours; at 70° C., and the redox potential of the slurry ranged between 80-120 mV measured against S.C.E.

The composition of the slurries, solutions and solids in the various streams of FIG. 3 are shown in TABLE 4.

It can be seen that the nickel concentration in the residue when obtained by the process of the embodiment depicted in this example is reduced to 5 wt.%, while the copper has increased to 54.1%. The amount of copper retained in the solution to be treated for nickel and cobalt recovery is negligible, and hence requires no further separation treatment.

EXAMPLE 5

Figure 4:
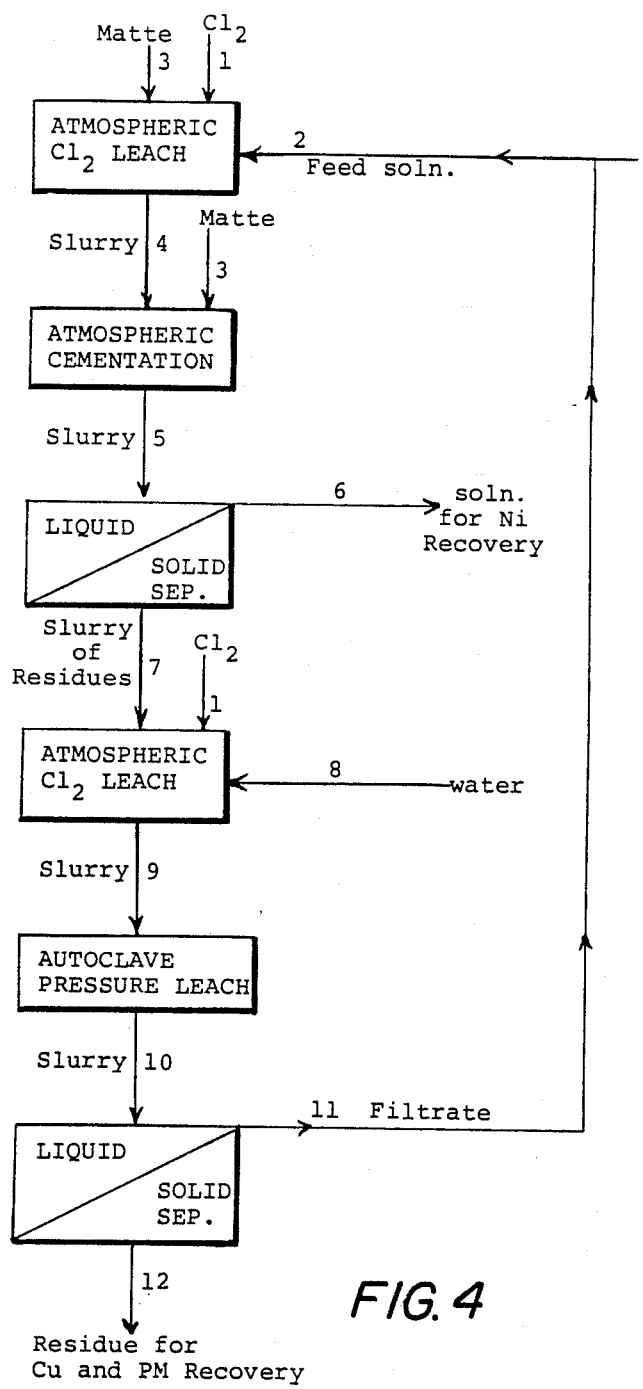

The process of this example is another variation of the embodiment described in Example 4. The matte was subjected to atmospheric chlorine leaching and cementation as has been described in Example 3, and treated in a first liquid solid separation step. The filtrate was treated for nickel recovery in a conventional manner, but as discussed above, the residue still retained 15 wt.% nickel, and hence was treated in a second atmospheric chlorine leach step. The flow sheet of the process of Example 5 is shown in FIG. 4. The thickened slurry of the residue was fed (7) to an atmospheric chlorine leach vessel, with chlorine gas (1) and water (8) additions. The second atmospheric chlorine leach with agitation was conducted at 105° C. for a period of 2 hours. The second chlorine leach slurry was fed through line (9) to an autoclave to be pressure leached at 3-4 atmospheres and 150° C. for further two hours. The slurry redox potential ranged between 180-200 mV measured against S.C.E. The pressure-leach slurry was fed (10) to a liquid-solid separating equipment. The separated filtrate (11) was returned to the first atmospheric leaching vessel through line (2). The separated solids (12), high in copper sulphides, were treated for copper and precious metal recovery.

The compositions of the slurries, solutions and the solids in the respective streams are tabulated in TABLE 5.

It can be seen that the separated residue was substantially depleted of nickel. The filtrate from the first liquid-solid separation step still contained some copper, which could be removed if required by a relatively inexpensive process step before recovering nickel from the solution. The filtrate from the second liquid-solid separation (11) had a relatively high nickel and copper concentration which was utilized by recycling to the first chlorine leach vessel.

EXAMPLE 6

Figure 5:
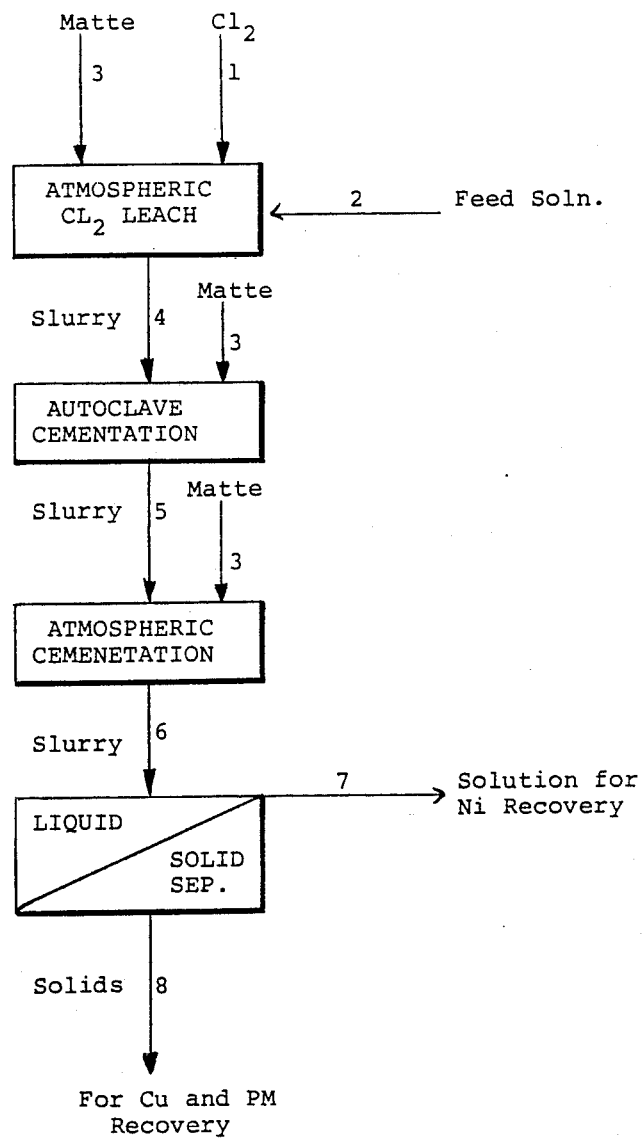
Figure 6:
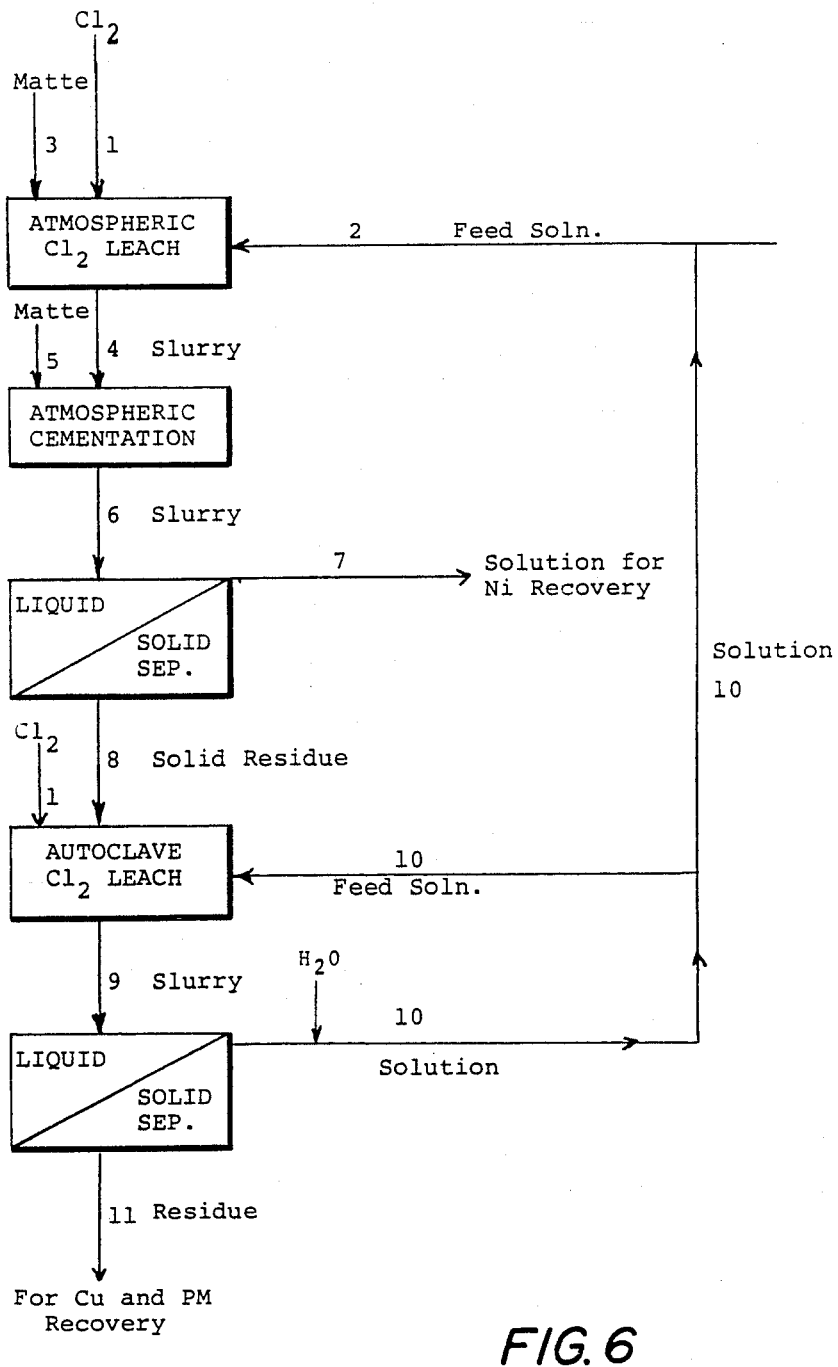

In the embodiment shown in Example 6, the pressure leaching step is conducted between the atmospheric chlorine leaching and the atmospheric cementation steps. The flow sheet of this process is schematically shown in FIG. 5. The atmospheric leach was carried out shown in the first stage of Example 3, at a temperature range of 105°–115° C., and the redox potential being controlled between 340–380 mV against S.C.E., with agitation, and in three hours residence time. The slurry was then fed (4) together with matte (3) to a pressure cementation autoclave. The slurry was agitated in the autoclave with the pressure being held at 4 atmospheres and the temperature between 140°–150° C. The slurry residence time was three hours and the redox potential in the autoclave had a range of 230–300 mV measured against S.C.E. The slurry from the autoclave cementation was fed (5) to an atmospheric cementation vessel for a further 1.5 hours residence with matte additions (3) and agitation. The redox potential ranged between 80–120 mV against S.C.E. during the cementation and temperature was 70° C.

The compositions of the various streams of slurries, solids and solutions are shown in TABLE 6, together with matte feed rates to the cementation vessels. It can be seen that the copper content of the solution from the liquid-solid separation stage has a very low copper content and thus could be directly treated for nickel recovery. The separated residue was very high in copper, 55.9 wt.%, and retained only about 6 wt.% of nickel and cobalt in total, which is an economically acceptable degree of separation.

EXAMPLE 7

The improved separation of nickel from copper contained in sulphidic matte particles described in this example incorporates an autoclave leaching step with chlorine gas injection into the atmospheric chlorine leach process. The process is shown schematically in FIG. 6. The two stages of the atmospheric chlorine leaching and cementation were conducted as described in Example 3, followed by a liquid-solid separation step. The solution from the liquid-solid separation through line (7) was taken for a nickel recovery as was conducted in Example 3; the solids which were still high in nickel (15 wt.%) were fed (8) to an autoclave to be pressure leached at 4 atmospheres pressure with chlorine additions (1) and agitation. The temperature in the pressure leach step was 140°–150° C. The duration of the pressure leach was two hours. The slurry from the autoclave was fed through line (9) to a second liquid-solid separation stage. The solution obtained (10) was returned to the atmospheric chlorine leach stage, a diluted bleed stream being taken to the chlorine-pressure leach autoclave to form a slurry with the solid residues from the first liquid-solid separation step. The residue from the chlorine-pressure leach (11) was treated for copper and precious metal recovery.

The composition of the solution and the residues fed to and obtained from the chlorine pressure leach autoclave are shown in TABLE 7. The residue obtained in the autoclave leach step was low in nickel and high in copper and was further treated for copper and precious metal recovery. The separated solution was relatively high in copper and hence was returned to the atmospheric chlorine leach stage. The high copper content may be due to the relatively high acidity and sulphate content formed during the chlorine pressure leaching stage.

EXAMPLE 8

Figure 7:
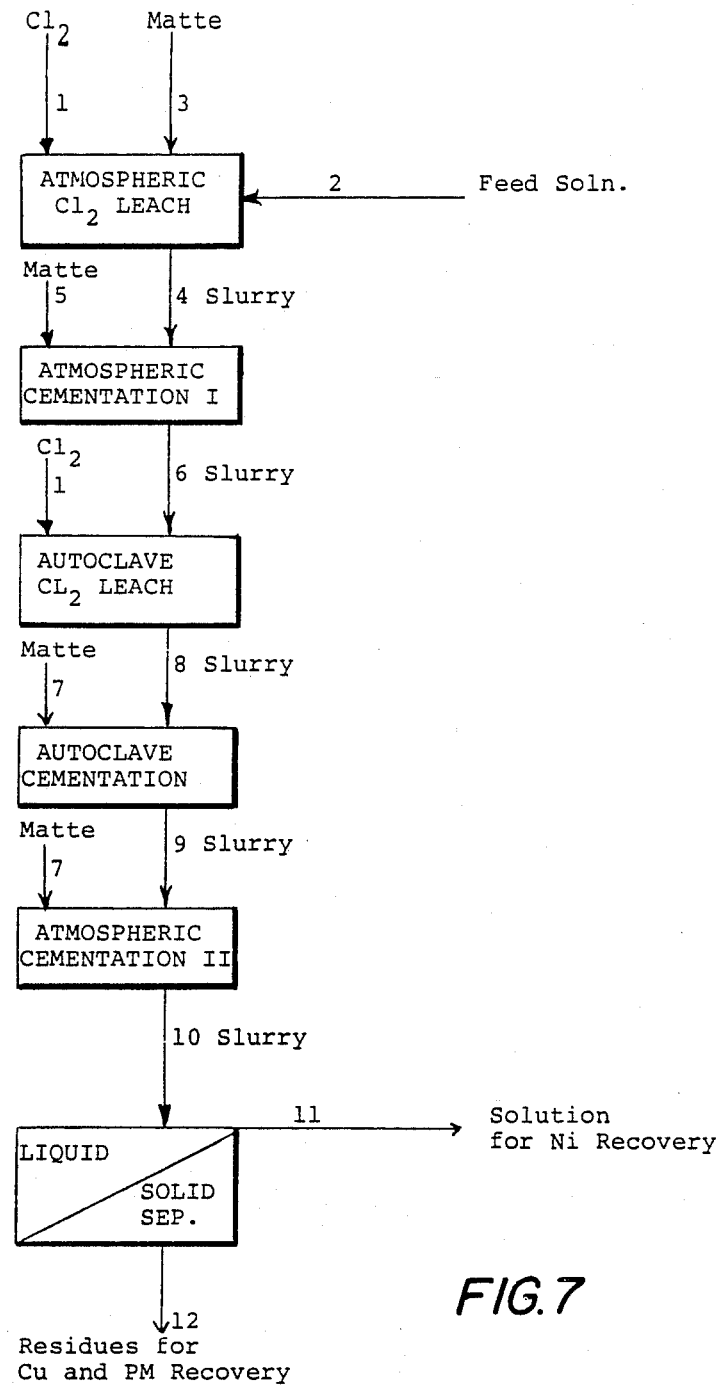

This process was a variation on the process described in Example 7, wherein the autoclave chlorine pressure leach stage followed directly the atmospheric chlorine leach and cementation stages without a liquid solid separation step. The autoclave chlorine pressure leach was followed by an autoclave cementation step and an atmospheric cementation step. The flow sheet of this process is shown in FIG. 7. The atmospheric chlorine leach and atmospheric cementation-I stages were conducted in a manner similar to Example 7. The slurry from the first cementation stage was fed through line (6) to an autoclave for a chlorine pressure leach step, with chlorine injection and agitation, at 4 atmospheres pressure and at a temperature range of 140°–150° C. The redox potential in the autoclave was held between 300–320 mV measured against S.C.E. The slurry for the chlorine pressure leach was fed (8) to an autoclave cementation step with agitation, together with fresh untreated matte (7). Residence time in both autoclaves was 1.5 hours. The temperature in the second autoclave was also between 140°–150° C. and the pressure was 4 atmospheres. The redox potential measured against S.C.E. was found to be 230°–360 mV. The autoclave cementation was followed by atmospheric cementation-II, by feeding the autoclave cemented slurry through line (9) to an open cementation vessel. Untreated matte (7) was added at the same rate as in the autoclave cementation. The temperature of the slurry in the atmospheric cementation was 70° C. The redox potential was between 80–120 mV (S.C.E.) and the residence time was 1.5 hours. The slurry for the atmospheric cementation vessel was fed (10) to liquid-solid separation. The solution (11) was treated for nickel recovery and the chlorine leach and cementation stages without a liquid solid separation step. The autoclave chlorine pressure leach was followed by an autoclave cementation step and an atmospheric cementation step. The flow sheet of this process is shown in FIG. 7. The atmospheric chlorine leach and atmospheric cementation-I stages were conducted in a manner similar to Example 7. The slurry from the first cementation stage was fed through line (6) to an autoclave for a chlorine pressure leach step, with chlorine injection and agitation, at 4 atmospheres pressure and at a temperature range of 140°–150° C. The redox potential in the autoclave was held between 300–320 mV measured against S.C.E. The slurry for the chlorine pressure leach was fed (8) to an autoclave cementation step with agitation, together with fresh untreated matte (7). Residence time in both autoclaves was 1.5 hours. The temperature in the second autoclave was also between 140°–150° C. and the pressure was 4 atmospheres. The redox potential measured against S.C.E. was found to be 230–360 mV. The autoclave cementation was followed by atmospheric cementation-II, by feeding the autoclave cemented slurry through line (9) to an open cementation vessel. Untreated matte (7) was added at the same rate as in the autoclave cementation. The temperature of the slurry in the atmospheric cementation was 70° C. The redox potential was between 80–120 mV (S.C.E.) and the residence time was 1.5 hours. The slurry for the atmospheric cementation vessel was fed (10) to liquid-solid separation. The solution (11) was treated for nickel recovery and the residue (12) for copper and precious metal recovery.

TABLE 8 shows the composition of the various slurries fed to the autoclaves and to the second atmospheric cementation vessel, as well as the matte composition and its feed rate. The composition of the separated solution and the separated residue are also shown. It can be seen that the solution could be treated directly for nickel and cobalt recovery after the iron having been removed if desired, as the copper content was negligible. The residue had high copper content with the total nickel and cobalt retained being less than 6 wt.%.

EXAMPLE 9

Figure 8:
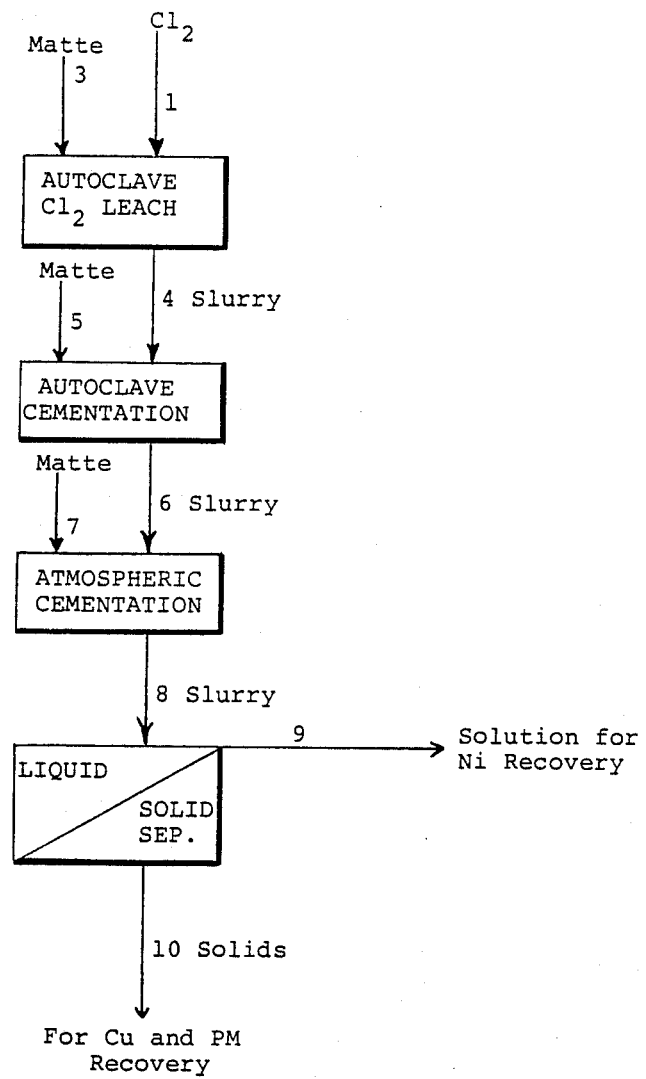

A simplified process based on the embodiment described in Example 8 is shown in FIG. 8. In this process, nickel and copper containing chloride solution was fed through line (2) to an autoclave with matte particles added (3) and leached in the presence of chlorine gas. The pressure inside the autoclave was 3-4 atmospheres and the temperature was between 140°-150° C. The redox potential was controlled at 310-320 Mv (S.C.E.); the slurry had a residence time of 2 hours. The slurry was subsequently taken through line (4) to an autoclave cementation stage and then to an atmospheric cementation vessel through line (6). Untreated matte was added to both cementation stages through lines (5) and (7) respectively. The autoclave cementation was conducted at 3-4 atm. pressure, at the range of 140°-150° C. The redox potential ranges of the slurry was 240-250 mV (S.C.E.) and the duration of the autoclave cementation was around 2 hours. The atmospheric cementation was carried out in an open vessel for 1.5 hours at 80° C.

The slurry from the atmospheric cementation (8) was subjected to liquid-solid separation, yielding a solution (9) with negligible copper content and a residue (10) with high copper content, and total nickel and cobalt content less than 6 wt.%.

The composition of the slurries in the various streams together with a final solution and residue compositions, are shown in TABLE 9.

The various embodiments of combining autoclave leaching with atmospheric chlorine leaching and cementation process steps for the improved separation of nickel and cobalt, from copper contained in particles of sulphidic matte and sulphidic alloys, are described above. The objective of obtaining a solution to be treated for nickel and cobalt recovery with very low copper content can be attained in all the embodiments described. The nickel and cobalt retained in the separated copper and precious metals containing residue can be varied between 1-6 wt.% according to the requirements dictated by market conditions and extraction process costs.

Further embodiments will be readily apparent to those skilled in the art, the scope of the invention being defined in the appended claims.

TABLE 3

| Stream No | SOLUTION, CONC g/L | | | | | | Flow Rate m³/hr | SOLIDS, WEIGHT % | | | | | Solid Feed or Removal Rate Kg/hr |
|---|---|---|---|---|---|---|---|---|---|---|---|---|---|
| | Ni | Co | Cu | Fe | SO$_4$ | Cl$^-$ | | Ni | Co | Cu | Fe | S | |
| 2 Feed | 70 | 1 | 20 | 1 | 19.0 | 95 | 25 | | | | | | |
| 3 Matte | | | | | | | | 39 | 1 | 33 | 2.5 | 23 | 6410 |
| 4 Slurry | 201 | 4.1 | 67.7 | 8 | 26 | 282 | 20 | 7 | 0.75 | 38 | 2.0 | 44 | 3317 |
| 5 Matte | | | | | | | | 39 | 1 | 33 | 2.5 | 23 | 4130 |
| 6 Slurry | | | | | | | | | | | | | |
| 7 Soln. | 232 | 4.8 | 0.2 | 9.8 | 26 | 282 | 20 | | | | | | |
| 8 Residue | | | | | | | | 15.0 | 0.63 | 48.9 | 1.66 | 29.6 | 8125 |

TABLE 4

| Stream No | SOLUTION, CONC. g/L | | | | | | | Flow m³/hr | SOLIDS, WEIGHT % | | | | | Feed Rate Total Kg/hr |
|---|---|---|---|---|---|---|---|---|---|---|---|---|---|---|
| | Ni | Co | Cu | Fe | SO$_4$ | Cl$^-$ | HCl | | Ni | Co | Cu | Fe | S | |
| 4 Slurry | 258 | 4.2 | 39 | 4.2 | 27 | 320 | 5 | 0.1 | 10 | 0.83 | 39.5 | 2.9 | 39 | 17 |
| 5 Slurry | 260 | 5.0 | 4.5 | 6.0 | 29.3 | 311 | 3.5 | | 3.5 | 0.43 | 54.5 | 2.2 | 34.4 | |
| 3 Matte | | | | | | | | | 39 | 1 | 33 | 2.5 | 23 | 1.6 |
| 7 Soln | 254 | 4.6 | 0.08 | 6.0 | 27.6 | 300 | | | | | | | | |
| 8 Residue | | | | | | | | | 5.0 | 0.45 | 54.1 | 2.1 | 33.9 | 21 | and in a redox potential range of 50-110 mV (S.C.E.).

TABLE 5

| Stream No | SOLUTION, CONC. g/L | | | | | | Flow m³/hr | SOLIDS, WEIGHT % | | | | | Feed Rate Kg/hr |
|---|---|---|---|---|---|---|---|---|---|---|---|---|---|
| | Ni | Co | Cu | Fe | SO$_4$ | Cl$^-$ | | Ni | Co | Cu | Fe | S | |
| 3 Matte | | | | | | | | 39 | 1 | 33 | 2.5 | 23 | |
| 2 Feed Soln. | 70 | 1 | 20 | 1 | 19 | 95 | | | | | | | |
| 6 Filt- | 230 | 4.8 | 5 | 9.8 | 26 | 280 | | | | | | | |

TABLE 5-continued

| | SOLUTION, CONC. g/L | | | | | | | SOLIDS, WEIGHT % | | | | | |
|---|---|---|---|---|---|---|---|---|---|---|---|---|---|
| Stream No | Ni | Co | Cu | Fe | SO$_4$ | Cl$^-$ | Flow m$^3$/hr | Ni | Co | Cu | Fe | S | Feed Rate Kg/hr |
| rate 7 Residue | | | | | | | | 18 | | 47 | 1.5 | 30 | 475 |
| 1 Residue | | | | | | | | 1.1 | | 57 | 1.0 | 38 | 390 |
| 11 Filtrate | 207 | | 12.5 | | 250 | 1.4 | | | | | | | |

TABLE 6

| | SOLUTION, CONC. g/L | | | | | | | | SOLIDS, WEIGHT % | | | | | |
|---|---|---|---|---|---|---|---|---|---|---|---|---|---|---|
| Stream No | Ni | Co | Cu | Fe | SO$_4$ | Cl$^-$ | HCl | Flow m$^3$/hr | Ni | Co | Cu | Fe | S | Feed Rate Kg/hr |
| 4 | 228 | 5.2 | 68 | 4.6 | 26.4 | 264 | 2-5 | 0.1 | 6.5 | 0.58 | 37.5 | 2.3 | 44.9 | 19 |
| 3 Autoclave Cementation | | | | | | | | | 39 | 1 | 33 | 2.5 | 23 | Matte 6.5 |
| 5 | 240 | 5.8 | 18.2 | 6 | N/A | N/A | 3-6 | | 4.0 | 0.55 | 50.6 | 2.4 | 36.6 | |
| 3 Atm. Cementation | | | | | | | | | 39 | 1 | 33 | 2.5 | 23 | Matte 2.8 |
| 7 Soln. | 250 | 5.4 | 0.16 | 6 | 26.4 | | | | | | | | | 32 |
| 8 Solids | | | | | | | | | 5.5 | 0.55 | 55.9 | 2.1 | 33.4 | Total Weight to L/S |

TABLE 7

| | SOLUTION, CONC. g/L | | | | | | | | SOLIDS, WEIGHT % | | | | | |
|---|---|---|---|---|---|---|---|---|---|---|---|---|---|---|
| Stream No | Ni | Co | Cu | Fe | SO$_4$ | Cl$^-$ | HCl | Flow m$^3$/hr | Ni | Co | Cu | Fe | S | Feed Rate Kg/hr |
| 8 Residue | | | | | | | | | 15 | 0.63 | 48.9 | 1.66 | 29.6 | 75 |
| 10 Solution | 171 | 4 | 55 | 9 | 33 | 240 | 5-10 | 0.1 | | | | | | |
| 11 Autoclave Leach Residue | | | | | | | | | 2 | 0.3 | 54.5 | 0.77 | 37.4 | 58.2 |

TABLE 8

| | SOLUTION, CONC. g/L | | | | | | | | SOLIDS, WEIGHT % | | | | | |
|---|---|---|---|---|---|---|---|---|---|---|---|---|---|---|
| Stream No | Ni | Co | Cu | Fe | SO$_4$ | Cl$^-$ | HCl | Flow m$^3$/hr | Ni | Co | Cu | Fe | S | Feed Rate Kg/hr |
| 6 Slurry | 188 | 5.2 | 0.03 | 3.8 | 23.2 | 230 | 4-8 | 0.1 | 22.3 | 0.80 | 43.8 | 1.9 | 26.2 | 23 |
| 8 Slurry | 250 | 6.8 | 18.8 | 5.2 | N/A | 306 | 2-5 | | 2.6 | 0.35 | 52.5 | 1.4 | 40.3 | 14.7 |
| 7 Matte | | | | | | | | | 39 | 1 | 33 | 2.5 | 23 | 3 |
| 9 Slurry | 266 | 7.4 | 4.0 | 6.0 | | 314 | 2 | | 3.5 | 0.33 | 56.3 | 1.5 | 33.5 | |
| 11 Soln. | 262 | 7.2 | 0.05 | 6.0 | | 310 | | 0.96 | | | | | | |
| 12 Solids | | | | | | | | | 5.4 | 0.34 | 56 | 1.5 | 33 | 22 |

TABLE 9

| | SOLUTION, CONC. g/L | | | | | | | SOLIDS, WEIGHT % | | | | | |
|---|---|---|---|---|---|---|---|---|---|---|---|---|---|
| Stream No | Ni | Co | Cu | Fe | SO$_4$ | Cl$^-$ | Flow m$^3$/hr | Ni | Co | Cu | Fe | S | Feed Rate Kg/hr |
| 2 Feed | 70 | 1 | 5 | 1 | 20 | 75 | 0.1 | | | | | | |
| 3 Matte | | | | | | | | 39 | 1 | 33 | 2.5 | 23 | 45.0 |
| 4 Slurry | 240 | 4.8 | 32 | 8.6 | 26.2 | 322 | 0.1 | 2.5 | 0.3 | 50 | 1.5 | 42 | 24. |
| 5 Matte | | | | | | | | 39 | 1 | 33 | 2.5 | 23 | 4.0 |
| 6 Slurry | 250 | 4.8 | 5 | 8.8 | 27 | 322 | 0.1 | 3.8 | 0.35 | 54 | 1.6 | 37 | 30 |
| 7 | | | | | | | | 39 | 1 | 33 | 2.5 | 23 | 2.5 |

TABLE 9-continued

| Stream No | SOLUTION, CONC. g/L | | | | | | Flow m³/hr | SOLIDS, WEIGHT % | | | | | Feed Rate Kg/hr |
| --- | --- | --- | --- | --- | --- | --- | --- | --- | --- | --- | --- | --- | --- |
| | Ni | Co | Cu | Fe | SO₄ | Cl⁻ | | Ni | Co | Cu | Fe | S | |
| Matte 9 Soln. | 250 | 5 | 0.2 | 9 | 26 | 322 | 0.1 | | | | | | |
| 10 Solids | | | | | | | | 5.5 | 0.35 | 55 | 1.6 | 36 | |

The embodiment of the invention in which an exclusive property or privilege is claimed are defined as follows:

1. In a process for the separation of nickel from copper contained in solid particles selected from the group consisting of ground copper and nickel-containing sulphidic matte and sulphidic alloys, which particles have been slurried in an acidic solution and chlorine leached at atmospheric pressure to produce a slurry of particles in a chloride solution, the improvement comprising subjecting said slurry to over-atmospheric chlorine leaching at a pH less than 4, in the presence of air and at temperatures higher than 110° C. in an autoclave to obtain a nickel enriched chloride solution said solution also containing dissolved copper and residue containing copper sulphide and being impoverished in nickel, subsequently precipitating dissolved copper in said nickel enriched chloride solution by cementation onto freshly added solid particles selected from the group consisting of said sulphidic matte and sulphidic alloys and treating the separated nickel impoverished residues for copper recovery.

2. A process according to claim 1 further comprising separating the nickel enriched chloride solution from said leach residue and treating said solution for nickel recovery.

3. A process according to claim 1 wherein said solid particles also contain precious metals which are subsequently recovered from said leach residue.

4. A process according to claim 1 wherein the cementation of the dissolved copper in said nickel enriched chloride solution onto freshly added particles is carried out in an autoclave at over-atmospheric pressure and at temperatures higher than 110° C.

5. A process according to claim 2 wherein said solid particles also contain cobalt, which is dissolved together with said nickel in said nickel-enriched chloride solution and is subsequently recovered from said solution.

6. A process according to claim 1 wherein a chlorine and oxygen bearing gas is injected into said autoclave during the over-atmospheric leaching of said slurry.

7. A process according to claim 2 conducted in a batch mode.

8. A process according to claim 2 conducted in a continuous mode.

9. A process for recovering nickel from nickel and copper containing solid particles selected from the group consisting of ground sulphidic matte and sulphidic alloys comprising the steps of:

(a) leaching solid particles selected from the group consisting of ground sulphidic matte and sulphidic alloys containing nickel and copper, and having been slurried in an acidic solution, in the presence of gaseous chlorine at atmospheric pressure at a redox potential selected to be within the range favoring dissolution of nickel over copper in said acidic solution, which redox potential is maintained by controlling the feed rate of said sulphidic particles together with the addition of said chlorine gas;

(b) transferring the chlorine leached slurried particles of step (a) composed of acidic nickel chloride containing solution and sulphidic particles impoverished in nickel content, to an autoclave;

(c) subjecting said chlorine leach slurry to further chlorine leaching at over-atmospheric pressure in the presence of air and at a temperature in excess of 110° C.;

(d) withdrawing the pressure leached slurry from said autoclave and reacting said slurry with freshly added unleached solid particles selected from the group consisting of sulphidic matte and sulphidic alloys containing nickel and copper for cementing out copper dissolved in said nickel chloride solution;

(e) subjecting the slurry of step (d) to liquid-solid separation to obtain a purified nickel chloride solution and a residue containing copper sulphide and residual nickel sulphide; and (f) treating the separated nickel solution for nickel recovery and said copper sulphidic residue for copper recovery.

10. A process according to claim 9 wherein unleached solid particles containing nickel and copper, are added to the chlorine leach slurry in said autoclave in step (c) for cementing out copper dissolved in said nickel chloride containing solution at over-atmospheric pressure and at temperatures higher than 110° C.

11. A process according to claim 9 wherein the nickel and copper containing sulphidic particles also contain precious metals which are retained in, and subsequently recovered from said separated residue.

12. A process according to claim 9 wherein the nickel and copper containing sulphidic particles also contain cobalt which is dissolved with the nickel and is retained in the purified nickel chloride solution, and is subsequently recovered therefrom.

13. A process for recovering nickel from nickel and copper containing solid particles selected from the group consisting of ground sulphidic matte and sulphidic alloys comprising the steps of:

(a) leaching solid particles selected from the group consisting of ground sulphidic matte and sulphidic alloys containing nickel and copper, which particles have been slurried in an acidic solution, in the presence of chlorine gas at atmospheric pressure at a redox potential selected to be within the range favoring dissolution of nickel over copper is said acidic solution, which redox potential is maintained by controlling the addition of said chlorine gas with respect to the feed rate of said sulphidic particles, and in a subsequent step adding unleached nickel and copper containing solid sulphidic particles to said leached slurry to obtain leached nickel depleted sulphidic particles slurried in a first nickel chloride containing solution;

(b) separating said nickel chloride containing solution resulting in step (a) and recovering nickel from said solution;

(c) transferring the leached nickel depleted sulphidic residue resulting in the separation step (b) to an autoclave, and adding a chloride solution to form an aqueous slurry for further leaching with additions of chlorine gas at over-atmospheric pressure in the presence of air and at temperatures in excess of 110° C., to yield a substantially nickel-free copper sulphide containing residue and a second nickel chloride containing solution;

(d) separating said second nickel chloride containing solution resulting in step (c) and returning the solution to said atmospheric leaching step (a); and (e) treating the sulphidic residue of step (c) for copper recovery.

14. A process according to claim 13 wherein the nickel and copper containing sulphidic particles also contain precious metals which are retained in, and subsequently recovered from said separated sulphidic pressure-leached residue of step (c).

15. A process according to claim 13 wherein the nickel and copper containing sulphidic particles also contain cobalt which is dissolved with the nickel and is retained in said first and second nickel chlorine solutions, and is subsequently recovered therefrom.

16. A process for the separation of nickel from nickel and copper containing solid particles selected from the group consisting of ground sulphidic matte and sulphidic alloys comprising the steps of:

(a) leaching solid particles selected from the group consisting of ground sulphidic matte and sulphidic alloys containing nickel and copper, which particles have been slurried in an acidic solution in the presence of chlorine gas at atmospheric pressure, at a redox potential selected to favor nickel dissolution over copper dissolution in said acidic solution, which redox potential is maintained by controlling the addition of said chlorine gas with respect to the feed rate of said sulphidic particles, and in a subsequent step adding a second charge of unleached nickel and copper containing solid sulphidic particles, to obtain nickel depleted sulphidic particles slurried in acidic nickel chloride containing solution;

(b) transferring said slurry of nickel depleted particles in nickel chloride containing solution obtained in step (a) to an autoclave, and leaching said slurry with further injection of chlorine gas in said autoclave at over-atmospheric pressure in the presence of air and at temperatures in excess of 110° C. to obtain a chlorine-pressure leached slurry;

(c) adding a third charge of unleached nickel and copper containing solid sulphidic particles to said chlorine-pressure leached slurry in step (b) and reacting the resulting mixture at over-atmospheric pressure and at temperatures in excess of 110° C., to yield a copper-sulphide-containing, nickel-depleted leach residue slurried in nickel chloride containing solution;

(d) withdrawing said nickel depleted sulphidic particles slurried in nickel chloride containing solution from said autoclave, and reacting said slurry with a fourth charge of unleached nickel and copper containing solid sulphidic particles at atmospheric pressure to cement dissolved copper onto said unleached solid sulphidic particles;

(e) subjecting the slurry resulting in step (d) to liquid-solid separation, to obtain a purified nickel chloride containing solution for the recovery of nickel therefrom, and a copper sulphide containing residue to be treated for copper recovery.

17. A process according to claim 16 wherein precious metals present in the solid particles of sulphidic matte and alloys are retained in, and subsequently recovered from the separated copper sulphide containing residue.

18. A process according to claim 16 wherein the nickel and copper containing sulphidic particles also contain cobalt which is dissolved with the nickel and is retained in said separated nickel chloride containing solution, and is subsequently recovered therefrom.

19. A process for separating nickel from nickel and copper containing solid particles selected from the group consisting of ground sulphidic matte and sulphidic alloys, comprising the steps of:

(a) leaching a first charge of said solid particles, which particles have been slurried in an acidic chloride solution in a first autoclave, in the presence of gaseous chlorine at over-atmospheric pressure in the presence of air at a selected redox potential selected to favor dissolution of nickel over that of copper in said acidic solution, which redox potential is maintained by controlling the addition of chlorine gas with respect to the feed rate of said sulphidic particles, at a temperature in excess of 110° C.;

(b) transferring the chlorine leached slurried particles of step (a), composed of acidic nickel chloride containing solution of nickel-impoverished sulphidic particles, to a second autoclave and adding a second charge of unleached solid sulphidic particles containing copper and nickel for cementing copper dissolved in said nickel chloride solution at over atmospheric pressure and at a temperature in excess of 110° C.;

(c) withdrawing said cemented slurry from the second autoclave into an open container;

(d) adding a third charge of unleached solid sulphidic particles containing copper and nickel to said cemented slurry, to cement out residual copper contained in said nickel chloride solution at atmospheric pressure;

(e) subjecting the slurry obtained in the atmospheric cementation step (d) to liquid-solid separation to yield a purified nickel chloride solution and a residue comprising copper sulfide; and (f) recovering nickel from said separated nickel chloride containing solution and treating said residue for copper recovery.

20. A process according to claim 19 wherein the nickel and copper containing sulphidic particles also contain cobalt which is dissolved with the nickel and is retained in the separated nickel chloride solution, and is subsequently recovered therefrom.

21. A process according to claim 19 wherein the nickel and copper containing sulphidic particles also contain precious metals which are retained in, and subsequently recovered from said separated copper sulphide containing residue.

22. A process according to claim 10 wherein the nickel and copper containing sulphidic particles also contain precious metals which are retained in, and subsequently recovered from said separated residue.

23. A process according to claim 10 wherein the nickel and copper containing sulphidic particles also contain cobalt which is dissolved with the nickel and is retained in the purified nickel chloride solution, and is subsequently recovered therefrom.

24. In a process for the separation of nickel from copper contained in solid particles selected from the group consisting of ground copper and nickel-containing sulphidic matte and sulphidic alloys, which particles have been slurried in an acidic solution and chlorine leached at atmospheric pressure to produce a slurry of particles in a chloride solution, the improvement comprising subjecting said slurry to over-atmospheric chlorine leaching at a pH less than 4, at temperatures higher than 113° C. and in the presence of air in an autoclave to obtain a nickel enriched chloride solution, said solution also containing dissolved copper and residue containing copper sulphide and being impoverished in nickel, subsequently precipitating dissolved copper in said nickel enriched chloride solution by cementation onto freshly added solid particles selected from the group consisting of said sulphidic matte and sulphidic alloys and treating the separated nickel impoverished residues for copper recovery.

* * * * *

UNITED STATES PATENT AND TRADEMARK OFFICE
CERTIFICATE OF CORRECTION

PATENT NO. : 4,828,809

DATED : May 9, 1989

INVENTOR(S) : Thomas THOMASSEN, Carl O. KOSTOL, Hans ZACHARIANSEN and Erling STENSHOLT It is certified that error appears in the above-identified patent and that said Letters Patent is hereby corrected as shown below:

On the Title Page, item [75] after "Vagsbygd" add

-- Erling Stensholt, Søgne, -- .

Signed and Sealed this

Twenty-sixth Day of December, 1989

*Attest:*

JEFFREY M. SAMUELS

*Attesting Officer*     *Acting Commissioner of Patents and Trademarks*